United States Patent [19]
Shirai et al.

[11] Patent Number: 5,174,001
[45] Date of Patent: Dec. 29, 1992

[54] METHOD AND APPARATUS FOR FINISHING GROOVED ARTICLES

[75] Inventors: Yoshimichi Shirai, Toyoake; Hiromitu Ibe, Kosai; Yasutosi Kada, Nishio; Kazushi Sugishima, Hamamatsu, all of Japan

[73] Assignees: Nippondenso Co., Ltd., Kariya; Asmo Co., Ltd., Kosai, both of Japan

[21] Appl. No.: 602,936

[22] Filed: Oct. 24, 1990

Related U.S. Application Data

[60] Continuation of Ser. No. 379,964, Jul. 14, 1989, abandoned, which is a division of Ser. No. 184,123, Apr. 20, 1988, Pat. No. 4,862,575.

[30] Foreign Application Priority Data

Apr. 23, 1987 [JP] Japan .................. 62-98580
Apr. 23, 1987 [JP] Japan .................. 62-98581

[51] Int. Cl.⁵ .............................................. B23B 7/00
[52] U.S. Cl. ................................ 29/27 B; 118/107; 118/320
[58] Field of Search ............. 118/318, 319, 320, 321, 118/101, 107, 271; 264/259, 310, 265, 272.17; 425/72.1, 129.1; 156/578, 295; 29/423, 424, 557, 558, 597, 27 B, 33 L; 409/31, 33, 37, 46, 293, 302, 304, 313

[56] References Cited

U.S. PATENT DOCUMENTS

| | | | |
|---|---|---|---|
| 2,626,222 | 1/1953 | Spencer | 118/107 X |
| 2,967,347 | 1/1961 | Rhea | 118/320 X |
| 3,399,649 | 9/1968 | Kidgell et al. | 118/321 X |
| 3,991,152 | 11/1976 | Santi et al. | 264/310 X |
| 4,643,863 | 2/1987 | Martini | 264/265 X |
| 4,653,965 | 7/1992 | Fry et al. | 29/27 B X |
| 4,850,302 | 7/1989 | Hoffman | 118/107 X |

FOREIGN PATENT DOCUMENTS

| | | | |
|---|---|---|---|
| 2399907 | 4/1979 | France | 264/265 |
| 132505 | 4/1985 | Japan | 264/259 |

Primary Examiner—Joseph M. Gorski
Attorney, Agent, or Firm—Burns, Doane, Swecker & Mathis

[57] ABSTRACT

Grooves in an article such as a commutator are filled with a soft brittle material before a grooved surface of the article is cut. With the grooves thus filled, the cutting is performed continuously and smoothly without involving formation of burrs projecting into the groove. The soft brittle material includes a water soluble material which can easily be removed from the grooves by merely immersing the article in water. Preferably, the soft brittle material comprises a sublimable material which is self-vanishing or disappearing as it undergoes sublimation to the vapor state when it is left to stand in the atmosphere.

4 Claims, 8 Drawing Sheets

METHOD AND APPARATUS FOR FINISHING GROOVED ARTICLES

This application is a continuation of application Ser. No. 379,964, filed Jul. 14, 1989 and now abandoned, which is a divisional of application Ser. No. 07/184,123, filed Apr. 20, 1988 now U.S. Pat. No. 4,862,575.

BACKGROUND OF THE INVENTION

1. Field of the Invention

This invention relates to a method and apparatus for finishing a grooved surface of an article such as a commutator before the grooved surface is cut.

2. Description of the Prior Art

As is well known in the art, it has long been a keen desire to devise a method capable of finishing the grooved surface of an article, e.g., a grooved commutator, a shaft having a keyseat, a bobbin having an axial groove, etc. without formation of objectionable burrs around the grooves when the grooved surface is cut or formed. For purposes of illustration only, the present invention will be described throughout the specification with reference to a commutator.

Commutators are used in various motors such as DC motors having brushes, or other appliances and are composed of a plurality of commutator segments or bars arranged in a drumlike cylinder and supported by a commutator sleeve made of a thermosetting synthetic resin, with air gaps or grooves defined between adjacent ones of the commutator bars and the outer periphery of the commutator sleeve.

In the manufacture of the commutators of the foregoing construction, it is customary practice to form a commutator blank by first filling an internally and circumferentially grooved pipe of an electrically conductive material such as copper with a thermosetting synthetic resin, and then separating the copper pipe into a plurality of circumferentially spaced commutator segments or bars which are electrically separated from one another by undercuts or grooves defined between the adjacent ones of the commutator bars. Then the commutator blank thus produced is finished by cutting or turning the outer peripheral surface thereof so as to provide an improved commutation.

The conventional practice is disadvantageous in that, due to the presence of the grooves between the commutator bars, the turning step is performed interruptedly or non-continuously and hence involves the formation of objectionable burrs projecting from edges of the respective commutator bars. The burrs thus produced are likely to cause an accidental conduction or shortcircuiting between the adjacent commutator bars. To avoid such shortcircuiting, a laborious cleaning of the grooves is necessary after the commutator blank is cut on the outer peripheral surface thereof.

With the foregoing drawbacks in view, somewhat successful methods have been proposed by Japanese Patent Laid-open Publication (JP-A) Nos. 55-58754 and 55-29247. According to the method disclosed in JP-A-55-58754, air gaps or grooves between adjacent commutator bars of a commutator blank are filled with a solvent soluble synthetic resin material which is removed by immersing the commutator blank in a solvent after the commutator blank is cut on its outer peripheral surface. In the method shown in JP-A-55-29247, a commutator blank is composed of a plurality of commutator bars circumferentially spaced by spacer bars made of a solvent soluble synthetic resin material. The spacer bars are also removed by immersing the commutator blank in a solvent after the outer peripheral surface of the commutator is finished.

The proposed methods are still unsatisfactory in that care must be taken both in the disposal of the dissolved synthetic resin and in the handling of the solvent, resulting in a low productivity of the commutator.

SUMMARY OF THE INVENTION

With the foregoing difficulties in view, it is an object of the present invention to provide a method of finishing a grooved article, which is simple but capable of finishing the grooved article easily at an increased rate of production.

Another object of the present invention is to provide a method for making a grooved surface of an article without producing objectionable burrs along the edges defining grooves in the article when the grooved surface is cut.

A further object of the present invention is to provide an apparatus for reducing the method into practice.

According to a first aspect of the present invention, there is provided a method of finishing a grooved surface of an article, comprising the steps of:

(a) filling a groove in the grooved surface with a soft brittle material; and (b) thereafter, cutting the grooved surface.

According to a second aspect of the present invention, there is provided an apparatus for finishing a grooved surface of an article, comprising:

(a) means for filling a groove in the grooved surface with a soft brittle material; and (b) means for cutting the grooved surface.

With the groove thus filled with the soft brittle material, the foregoing cutting is carried out continuously without producing objectionable burrs around the groove.

The soft brittle material may be a powder of water soluble material which can be removed by simply immersing the article in water after the grooved surface is cut on its outer peripheral surface. The use of the water soluble powder material is advantageous over the conventional practice because troublesome handling and disposal of a solvent is no longer necessary.

Preferably, the soft brittle material comprises a sublimable material adapted to be filled in the groove in the form of powder or solid. The sublimable material thus filled automatically disappears as it undergoes sublimation to the vapor state when the same is left to stand in the atmosphere for a predetermined period of time. With the use of the sublimable material, the above-mentioned filler removing step is no longer necessary and therefore the productivity of the article is greatly enhanced.

Many other advantages and features of the present invention will become manifest to those versed in the art upon making references to the detailed description and the accompanying sheets of drawings in which preferred structural embodiments incorporating the principles of the present invention are shown by way of illustrative example.

DETAILED DESCRIPTION OF A PREFERRED EMBODIMENT

Figures 1, 2, 3:
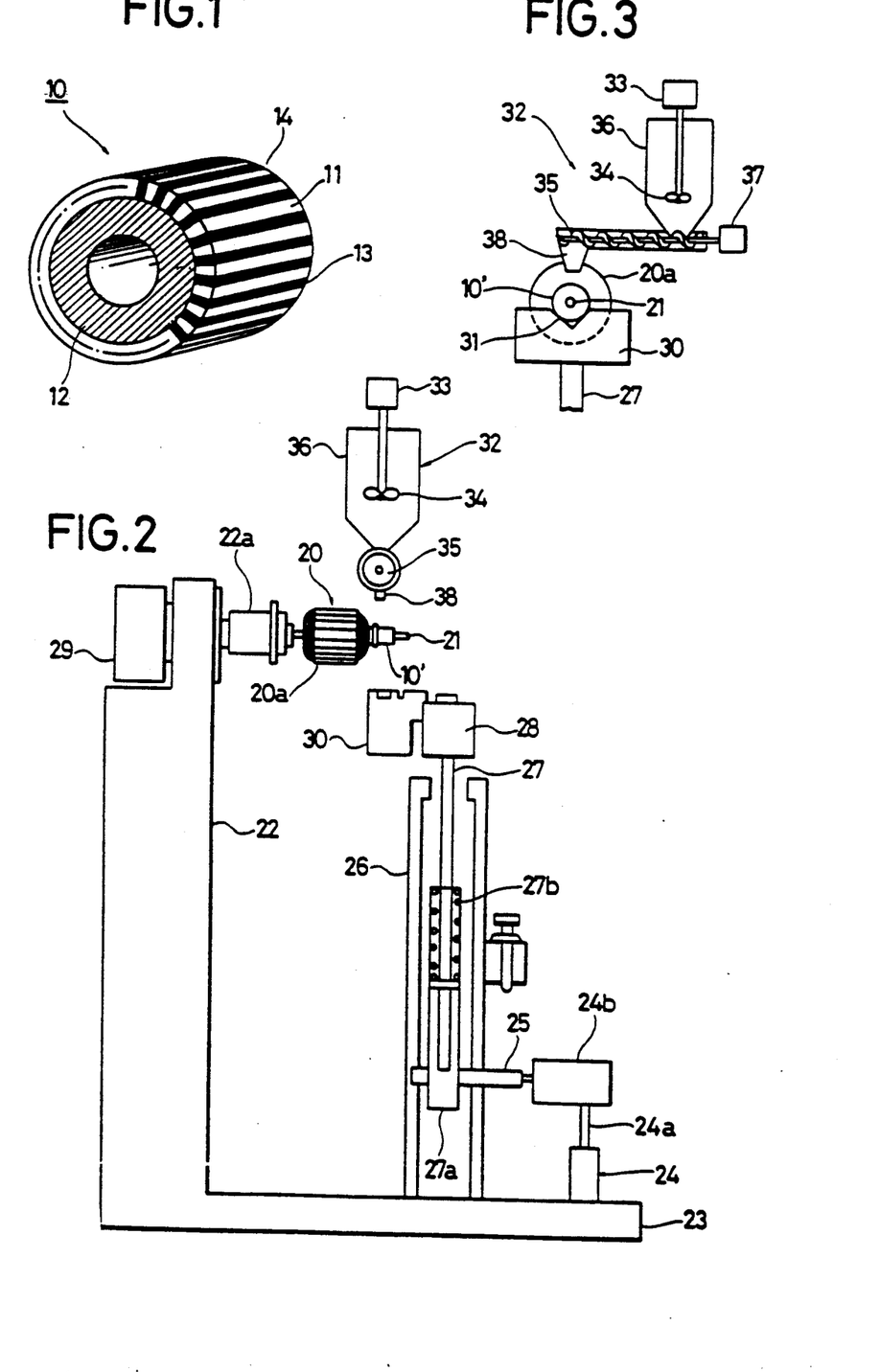
FIG. 1 is a perspective view of a finished commutator made in accordance with the present invention.
FIG. 2 is a diagrammatical front elevational view of an apparatus for making the finished commutator according to the present invention.
FIG. 3 is a side elevational view of an upper portion of FIG. 1, showing the apparatus with parts in an operating position.

Referring now to the drawings wherein like reference characters designate like or corresponding parts throughout several views, there is illustrated in FIG. 1, a commutator 10 processed or finished according to the present invention. The commutator 10 is provided with a plurality of commutator segments or bars 11 arranged in a drumlike cylinder supported by and around a commutator sleeve 12 molded of a thermosetting synthetic resin. Undercuts or grooves 13 are defined between the adjacent ones of the commutator bars 11 and the outer peripheral surface of the commutator sleeve 12. For purposes of illustration, the grooves 13 are filled with a soft brittle material 14 (indicated by the dark shading for clarity) but the material 14 is subsequently removed to complete the grooves 13 providing insulating air gaps between the adjacent commutator bars 11, as described later on.

The commutator 10 is produced by processing or finishing a commutator blank 10'(FIG. 2) which is substantially identical with the finished commutator 10 excepting that the commutator blank 10' has an outside diameter larger than the outside diameter of the finished commutator 10. The commutator blank 10' is produced in the following manner: First of all, a pipe of conductive material such as copper is finished on its inner peripheral surface by broaching. After the inner peripheral surface is circumferentially grooved, the copper pipe is filled with a thermosetting synthetic resin to form a commutator sleeve 12 which is firmly fitted within the copper pipe. Then the copper pipe is separated into a plurality of commutator bar blanks 11'(FIG. 6) circumferentially spaced by and electrically separated from one another by undercuts or grooves 13 defined between the adjacent commutator bar blanks 11, and the outer peripheral surface of the commutator sleeve 12.

According to the present invention, the commutator blank 10' is finished by first filling the grooves 13 with a soft brittle material 14, and thereafter cutting the outer peripheral surface of the commutator blank 10', thereby producing a finished commutator (identical to the commutator 10 shown in FIG. 1). Since the grooves 13 are filled with the soft brittle material 14, the cutting of the outer peripheral surface of the commutator blank 10' is performed continuously and uniformly. As a result, the outer surfaces of the respective commutator bars can be finished precisely and smoothly and are free of burrs which would otherwise cause a shortcircuiting or insulation failure.

The soft brittle material 14 includes a powder of a water soluble material in which the commutator 10 is immersed in water for removing the water soluble powder material 14 filled in the grooves 13. Eligible materials for the water soluble powder material 14 include a carbohydrate such as starch, dextrin or sucrose compound, or a carbonate such as calcium carbonate or sodium carbonate, or a chloride such as calcium chloride. Removing of such a water soluble powder material 14 is carried out more easily than the conventional removing step in which care must be taken in handling of a solvent and also in disposing a dissolved synthetic resin.

A more advantageous effect can be obtained when the soft brittle material 14 is composed of a sublimable material used in the form of powder or solid. The sublimable material 14 automatically disappears or extinguishes due to its sublimation to the vapor state as it is left to stand in the atmosphere for a predetermined period of time. With the use of the sublimable material 14, a post-cutting step such as cleaning of the commutator as described above is no longer necessary with the result that the commutator 10 can be manufactured at an increased rate of production. Eligible sublimable materials are those as shown in the following Table.

TABLE

| Sublimable Materials | Melting Point (mp) |
| --- | --- |
| p-acetophenonecarboxylic acid | 206 [°] |
| acenaphthenequinone | 260–261 |
| atropine | 114–116 |
| m-aminobenzoic acid | 177.9 |
| 2-aminoanthraquinone | 302 |
| β-aminoisovaleric acid | 217 |
| α-aminoisovaleric acid | 305–306 |
| 2-amino-p-cresol | 135 |
| 3-amino-p-cresol | 157–159 |
| 4-amino-o-cresol | 174–175 |
| 5-amino-o-cresol | 159–161 |
| 8-amino-2-naphthol | 205–207 |
| 0-aminophenol | 177 |
| p-aminophenol | 189.6–190.2 |
| Alizarin Blue | 268–270 |
| 1-anthracenecarboxylic acid | 246 |
| isatin | 203.5 |
| quinine | 177 |
| 2-aminoquinoline | 131.5 |
| quinhydrone | 171 |
| glyoxime | 178 |
| naphthalene | 80.5 |

As appears clear from the Table, the melting point of naphthalene is the lowest. This means that among others tabulated, naphthalene is the most effective sublimable material. As napthalene has such a low melting point, it is easy to handle and can be stored in the liquid phase at a low cost.

Referring now to FIG. 2, there is shown an apparatus for making a commutator 10 (identical with the commutator 10 shown in FIG. 1) by processing or finishing a commutator blank 10' of the construction described above. The commutator blank 10' constitutes part of a rotor assembly 20 of a DC motor and is fixedly mounted on a shaft 21 of the rotor assembly 20. The commutator blank 10' thus mounted is electrically connected with an armature 20a of the rotor assembly 20. The apparatus includes an L-shaped support 22 and a clamp unit 22a rotatably mounted on the upper end of the L-shaped support 22 for holding the shaft 21 of the rotor assembly 20 in a horizontal plane. The L-shaped support 22 includes a base 23 on which is mounted a vertical extending fluid-pressure actuator 24. The actuator 24 comprises an air cylinder having a piston rod 24a operatively connected through a connector block 24b to a saddle 25. The saddle 25 is slidably mounted on a pair of parallel spaced vertical guide rails 26 and vertically movable along the guide rails in response to the movement of the piston rod 24a. The saddle 25 is connected to the lower end of a vertical guide holder 27a which is positioned between the guide rails 26 and resiliently holds a pair of parallel spaced support rods 27 (only one shown) by a series of compression coil springs 27b. The support rods 27 extend upwardly beyond the upper ends of the guide rails 26 and support at their upper ends a rectangular mounting head 28. The mounting head 28 supports on its one side face a stuffing block 30.

The stuffing block 30 is positioned below the commutator blank 10' and, as shown in FIG. 3, it is composed of a V-block having a V-shaped groove 31 flaring upwardly at an angle which is suitable for the stable reception of the commutator blank 10' in the V-shaped groove 31.

The apparatus further includes a drive means 29 mounted on the support 22 for rotating the clamp unit 22a and hence the rotor assembly 20 held thereon, and a filling unit 32 positioned above the commutator blank 10' in vertical alignment with the stuffing block 30.

The filling unit 32 includes a first drive motor 33 for rotating an agitator 34 which is disposed in a hopper 36 for agitating a powder of a soft brittle material 14 stored in the hopper 26. The soft brittle powder material 14 being one selected from the water soluble materials of the class specified above, or one selected from the sublimable materials of the class specified above. The agitated powder material 14 is transferred by a screw conveyor or feeder 35 from the hopper 36 to a nozzle from which it is supplied onto the commutator blank 10', the screw feeder 35 being driven by a second drive motor 37.

Figure 6:
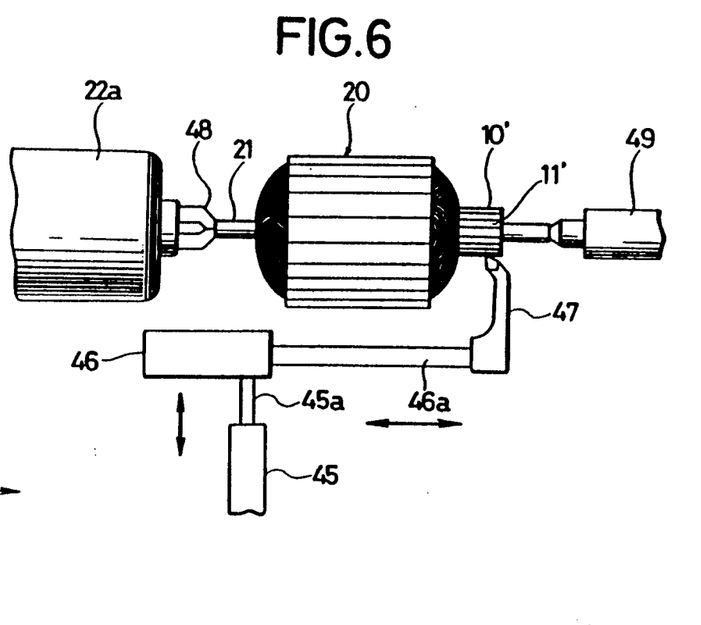
FIG. 6 is a fragmentary schematic front elevational view of a cutting unit of the apparatus.

The apparatus, as shown in FIG. 6, further includes a cutting device for cutting the outer peripheral surface of the commutator blank 10, The cutting device is disposed in juxtaposition to the stuffing block 30 and has a construction known per se. Namely, the cutting device includes a cross feed actuator comprising a first air cylinder 45, a longitudinal feed actuator comprising a second air cylinder 46 having a cylinder tube connected to the outer end of a piston rod 45a of the first air cylinder 45, a cutting tool 47 supported on the outer end of a piston rod 46a of the second air cylinder 46 and having a bit, a chuck assembly 48 incorporated in the clamp unit 22a for holding one end of the shaft 21, and a tail stock 49 for supporting the opposite end of the shaft as is well known in the art. Though not shown, the cross feed air cylinder 45 is secured to the support 22 (FIG. 2) and the tail stock 49 is slidably mounted on the support 22.

The operation of the apparatus thus constructed is described below with reference to FIGS. 2-4. The shaft 21 of the rotor assembly 20 is held on the clamp unit 22a, so that the rotor assembly 20 having the commutator blank 10' is loaded on the apparatus (the loading step 40 shown in FIG. 4). Then the drive means 29 is energized to concurrently rotate the clamp unit 22a and the rotor assembly 20 held thereon (the revolving step 41 shown in FIG. 4). The air cylinder 24 is actuated to extend its piston rod 24a whereupon the saddle 25 slides upwardly along the guide rails 26 to lift the support rods 27. The upward movement of the support rods 27 causes the stuffing block 30 to engage the commutator blank 10'. This upward movement of the support rods 27 continues for a short period of time against the force of the compression coil springs 27b with the result that the lower half of the outer peripheral surface of the commutator blank 10' is brought into intimate contact with the grooved portion 31 of the stuffing block 30 under the resiliency of the springs 27b, as shown in FIG. 3.

Figure 4:
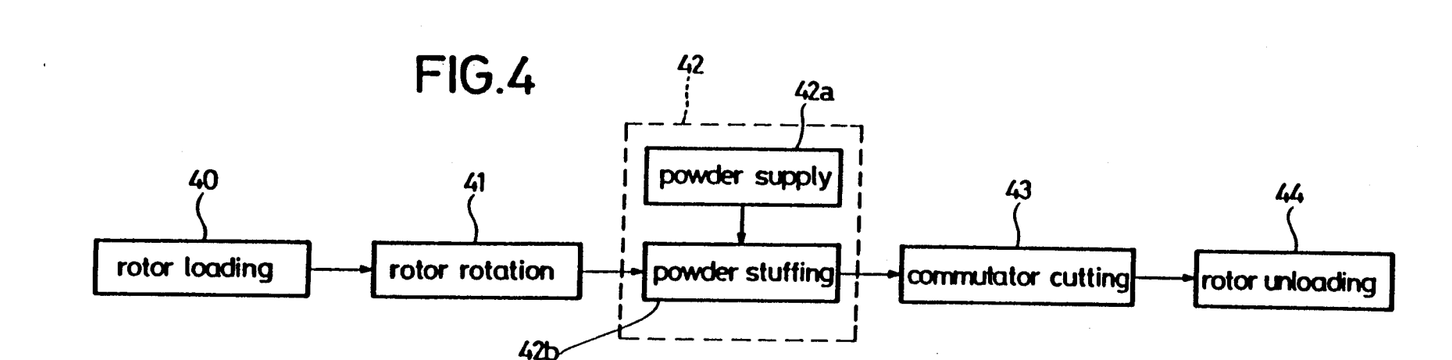
FIG. 4 is a flow chart illustrative of the operation of the apparatus.
Figure 5:
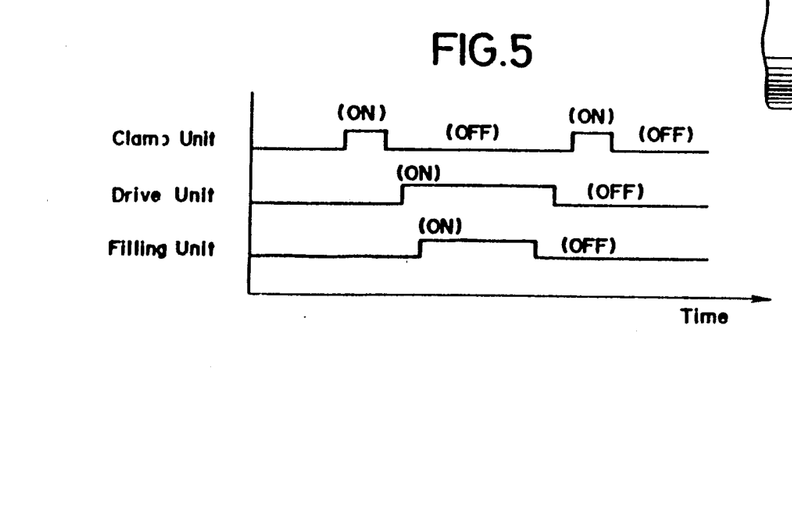
FIG. 5 is a time chart showing the operational relationship between several units of the apparatus.

The soft brittle powder material 14 which has been uniformly agitated by the agitator 34 is then conveyed by the screw feeder 35 from the hopper 36 to the nozzle 38 from which it is supplied onto the commutator blank 10'(the applying step 42a shown in FIG. 4). A part of the soft brittle powder material 14 thus supplied is directly received in the grooves (substantially identical to the grooves 13 shown in FIG. 1) in the commutator blank 10' and then is progressively built up in the groove as the rotor assembly 20 completes its turn several times. The remainder of the supplied material 14 is temporarily stacked on the stuffing block 30 and then is forcibly drawn into the grooves due to continuous frictional engagement between the outer peripheral surface of the commutator blank 10' and side walls of the V-shaped groove 31 in the stuffing block 30 (the stuffing step 42b shown in FIG. 4). Thus, it is appreciated that the stuffing block 30 constitutes part of the filling unit 32. When the commutator blank 10' has revolved several times, the grooves are fully filled with the compacted soft brittle powder material 14 (the filling step 42 shown in FIG. 4).

The air cylinder 24 is then actuated to retract the piston rod 24a, thereby causing the stuffing block 30 to be lowered from the operating position of FIG. 3 to the standby position of FIG. 2.

Subsequently, the tail stock 49 of the cutting unit is brought into contact with an end of the shaft 21 of the rotor assembly 20, as shown in FIG. 6. While rotating the rotor assembly 20, the longitudinal feed air cylinder 46 is driven to extend its piston rod 46 for moving the cutting tool 47 rightward until the bit of the cutting tool 47 is disposed near the outer end face of the commutator blank 10'. Then the cross feed air cylinder 45 is actuated to extend its piston rod 45a, causing the bit of the cutting tool 47 to be moved upward in the same figure by a distance corresponding to the desired cut depth. The longitudinal feed air cylinder 46 is again actuated to retract its piston rod 46a for causing the bit of the cutting tool 47 to be moved leftward in this figure, thereby cutting or turning the outer peripheral surface of the commutator blank 10'(the cutting step 43 shown in FIG. 4). The commutator blank 10' is thus finished into the commutator 10 shown in FIG. 1.

The rotor assembly 20 having the finished commutator 10 is detached from the clamp assembly 22a of the apparatus (the unloading step 44 shown in FIG. 4). In the case the grooves 13 in the commutator 10 are filled with the water soluble powder material 14, the commutator 10 is further subjected to a cleaning step in which the commutator 10 is immersed in a water bath (not shown) to remove the water soluble powder material 14 from the grooves 13. Alternately, where the grooves 14 are filled with the sublimable powder material 14, the commutator 10 is left to stand in the atmosphere for a predetermined period of time during which time the sublimable material 14 automatically disappears as it undergoes sublimation to the vapor state.

Figure 9:
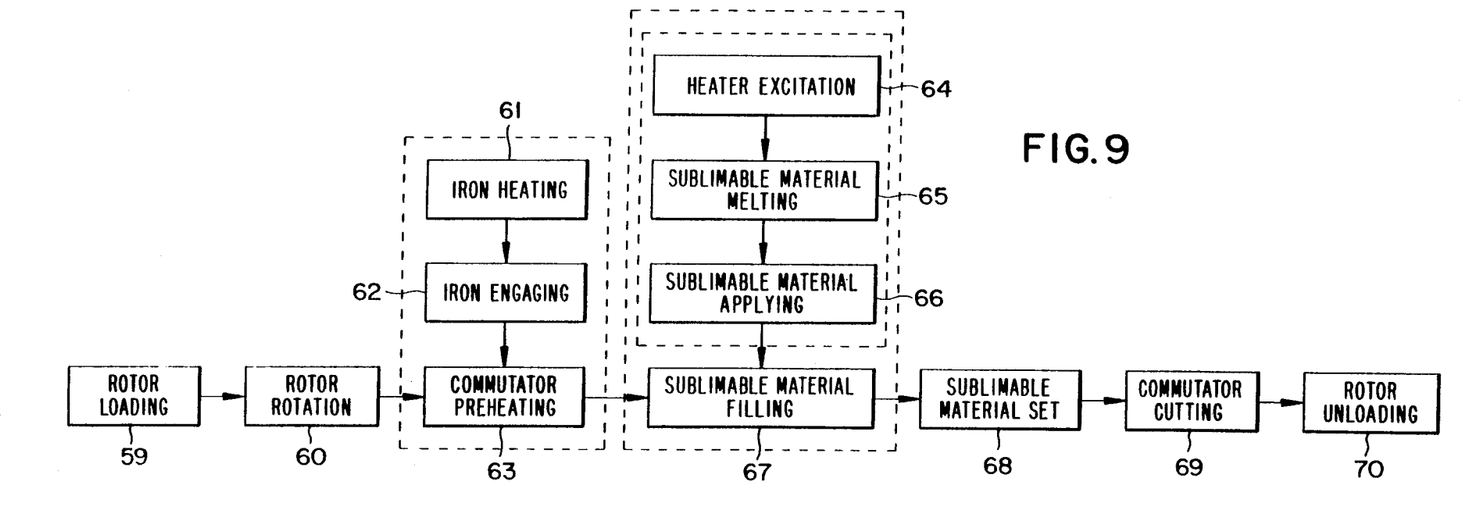
FIG. 9 is a flow chart illustrative of the operation of the apparatus shown in FIG. 8A.

Operations of the clamp unit 22a, drive unit 29 and filling unit 32 are linked as shown in FIG. 9 under the control of a microcomputer incorporated in a control unit (not shown) of the apparatus.

Figure 7:
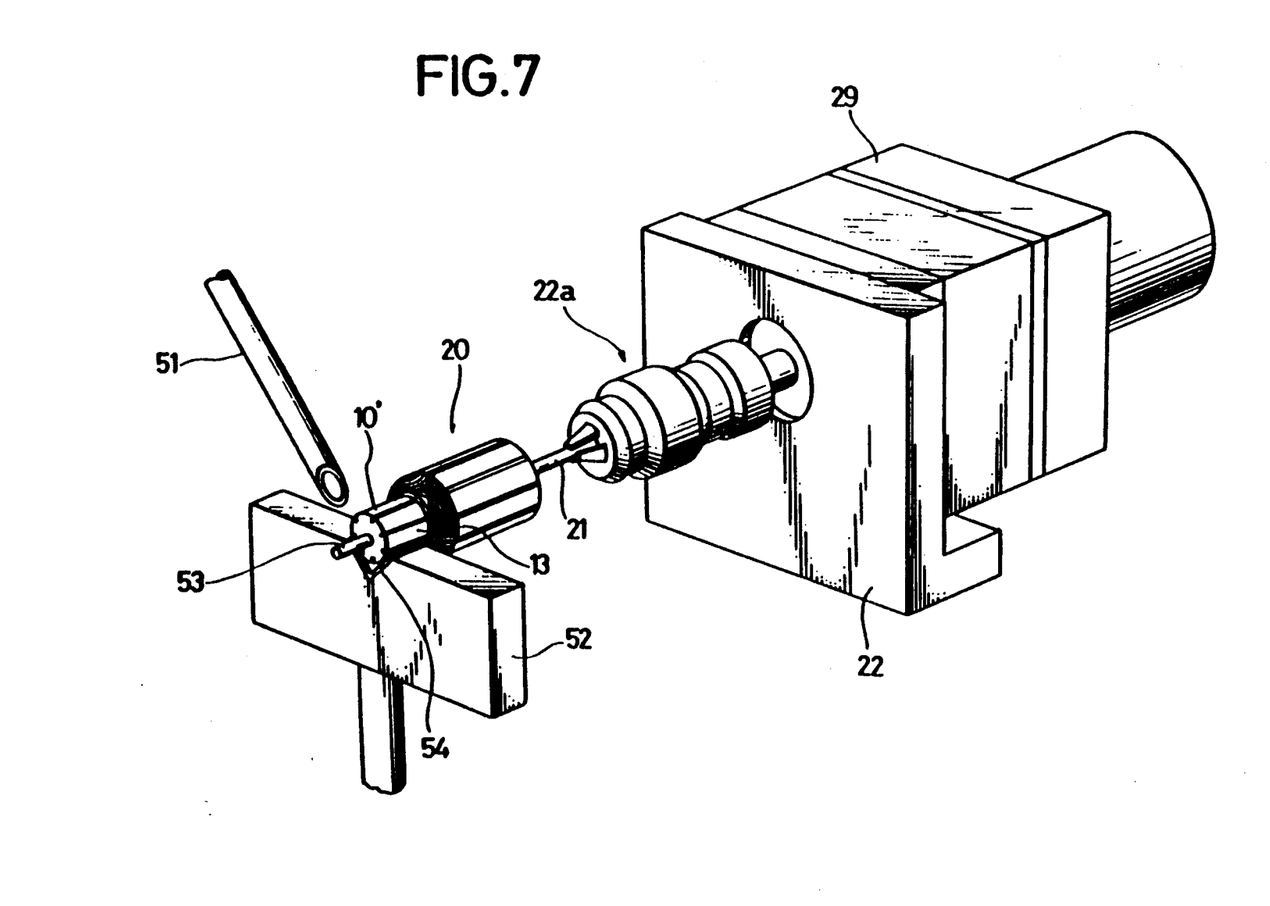
FIG. 7 is a perspective view of a modified filling unit according to the invention.

A modified filling unit shown in FIG. 7 is similar to the filling unit 32 of the foregoing embodiment but differs therefrom in that a soft brittle powder material is fed by its own gravity from an inclined feed pipe 51 onto a commutator blank 10'. The feed pipe 51 has a lower end disposed adjacent to a contacting region between the outer peripheral surface of the commutator blank 10' and a side wall of the V-shaped groove 53 in a stuffing block 52. The stuffing block 52 includes a support facing or liner 54 made of a resilient sheet material such as rubber or felt and overlying the V-shaped groove 53. The resilient support liner 54 thus provided is in close contact with the outer peripheral surface of the commutator blank 10' with the result that a positive stuffing or filling of the soft brittle powder material into the grooves 13 is achieved without damaging the commutator blank 10'. Though not shown, it is possible to oscillate the stuffing block 32 by means of a suitable vibrator, thereby ensuring that the soft brittle powder material can stably and speedily fill the grooves 13.

Figure 8A:
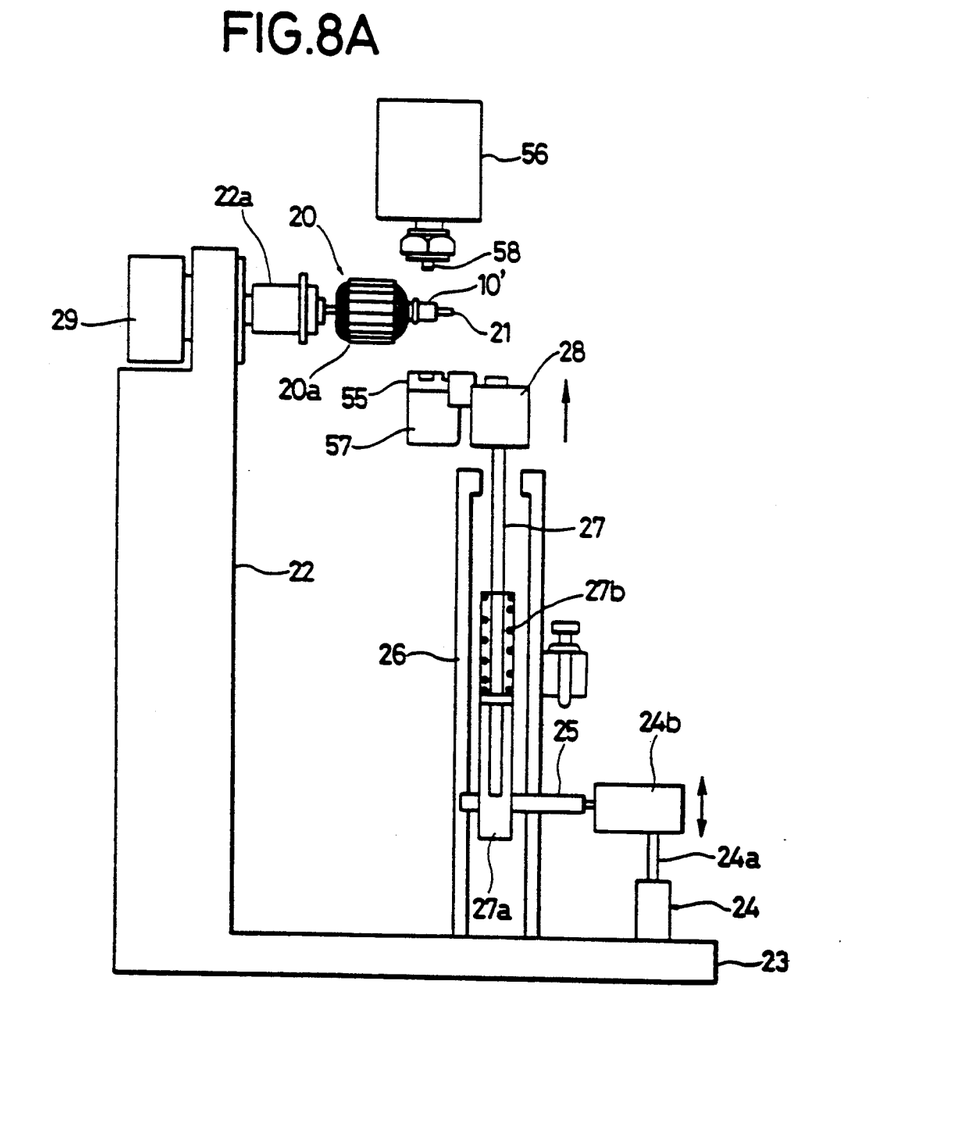
FIG. 8A is a view similar to FIG. 2, but showing a modified form of the finishing apparatus.
Figure 8B:
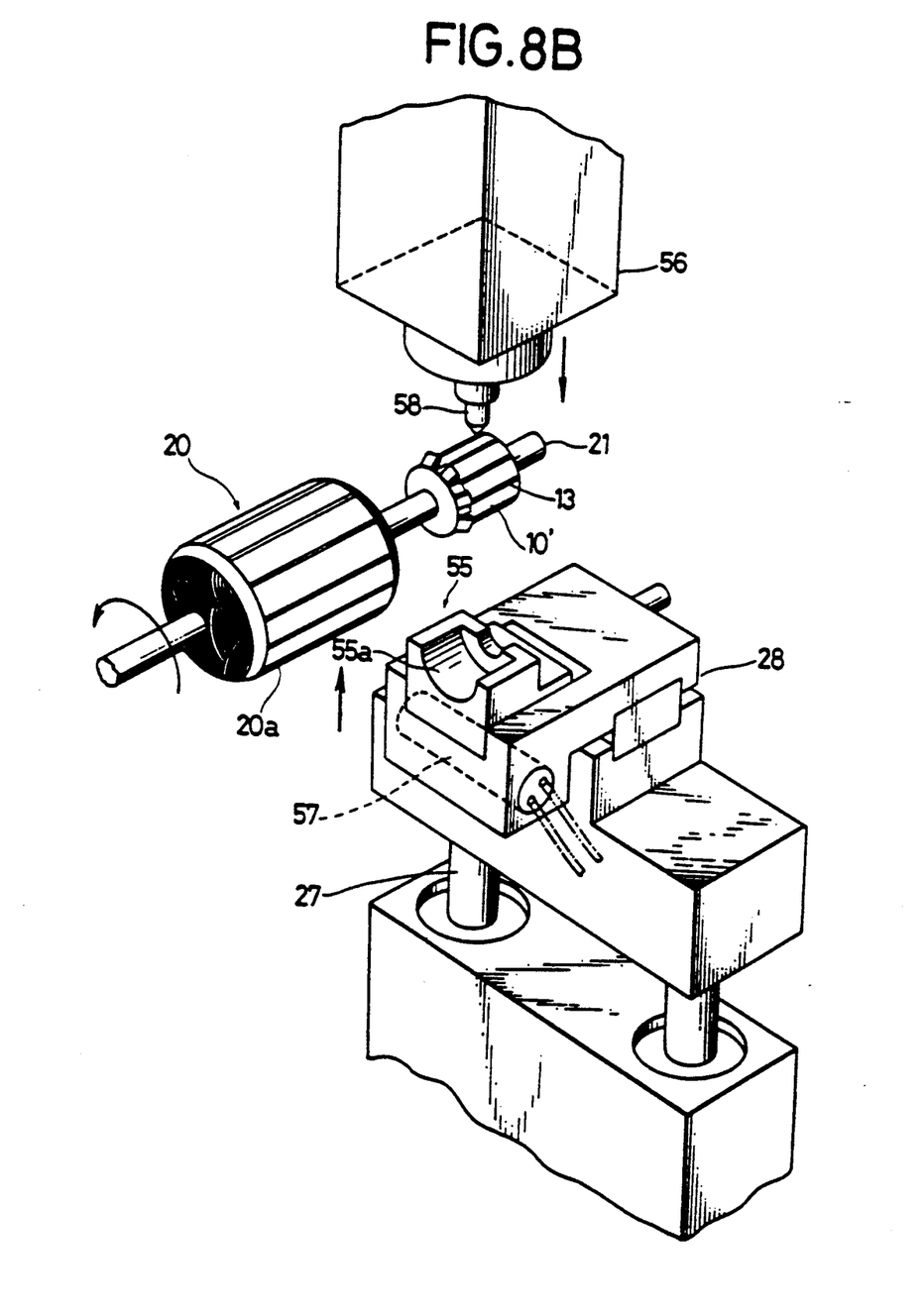
FIG. 8B is an enlarged perspective view of an upper portion of the apparatus shown in FIG. 8A.

FIGS. 8A and 8B show the general construction of a finishing apparatus according to another embodiment. The apparatus is so constructed as to fill the grooves 13 (FIG. 8B) in a commutator blank 10' with a solid brittle, sublimable material before the commutator blank 10' is cut on its outer peripheral surface. To this end, the apparatus differs from the apparatus of the foregoing embodiment in that a preheat iron 55 and a dispenser 56 are positioned in vertical alignment with each other across the commutator blank 10' to be processed. The preheat iron 55 is supported on the mounting head 28 and includes a semi-circular recess 55a complementary in contour to the shape of the commutator blank 10'. The iron 55 is adapted to be heated by a heater 57 mounted in the mounting head 28 immediately below the iron 55. The heater 57 is provided with a suitable temperature controlling means (not shown) for maintaining the preheat iron 55 in a suitably heated condition. The dispenser 56 is adapted to retain a sublimable material in the liquid state and to eject the molten sublimable material from a nozzle 58 onto the commutator blank 10'. The dispenser 56 also includes a temperature-controlled heater, not shown, for preventing the molten sublimable material from solidifying in the dispenser 56.

In operation, one end of the shaft 21 of a rotor assembly 20 is gripped by the clamp unit 22a of the apparatus so that the rotor assembly 20 is held in a horizontal plane (the loading step 59 shown in FIG. 9). Then the drive unit 29 is operated to rotate the clamp unit 22a and the rotor assembly 20, concurrently, as evidenced by the revolving step 60 shown in FIG. 9. Subsequently, the temperature-controlled heater 57 is energized to heat the preheat iron 55 until the temperature of the preheat iron 55 is elevated to a predetermined temperature higher than the melting point of the sublimable material. The air cylinder 24 is actuated to extend its piston rod 24a, causing the iron 55 to be moved upwardly until it is in engagement with the commutator blank 10'. In this instance, a lower half of the commutator blank 10' is slidably received in the semi-circular recess 55a. With this sliding contact with the preheat iron 55, the commutator blank 10' is heated to the same temperature as the iron 55 while the rotor assembly 20 is rotated for a certain or predetermined period of time (the steps of iron heating 61, engaging 62 and preheating 63 shown in FIG. 9).

Concurrently with the heating of the iron 55, the nonillustrated temperature-controlled heater is excited to heat the dispenser 56 at the afore-mentioned temperature so as to keep the sublimable material in the liquid or molten state, as evidenced by the heating and melting steps 64 and 65 shown in FIG. 9. The molten sublimable material is ejected form the nozzle 58 onto the commutator blank 10' while the latter is being rotated (the applying step 66 shown in FIG. 9). The molten sublimable material thus applied flows into the grooves 13 along the outer peripheral surface of the commutator blank 10' as the commutator blank 10' is revolved (the step 67 shown in FIG. 9). During this time, the sublimable material retains its flowability as it receives heat from the preheated commutator blank 10'. With this preheating, the molten sublimable material can smoothly flow into the grooves 13 and uniformly fill the same during a relatively short period of time. Thereafter, the air cylinder 24 is actuated to retract the piston rod 24a for lowering the preheat iron 55. Upon disengagement with the preheat iron 55, the commutator blank 10' is gradually cooled, causing the sublimable material to be cooled and to set in the grooves 13, as indicated by the solidifying step 68 shown in FIG. 9. The commutator blank 10' with grooves 13 filled with the solid sublimable material is then subjected to a cutting step 69 (FIG. 9) which is achieved in the same manner as the cutting shown in and described with reference to FIG. 6. The commutator blank 10, is thus finished into a commutator which is substantially identical with the finished commutator shown in FIG. 1.

The rotor assembly 20 having the finished commutator 10 is removed from the apparatus as evidenced by the unloading step 70 shown in FIG. 9. The rotor assembly 20 is left to stand in the atmosphere for a predetermined period of time during which the solid sublimable material automatically disappears a it undergoes sublimation to the vapor state.

Figure 10:
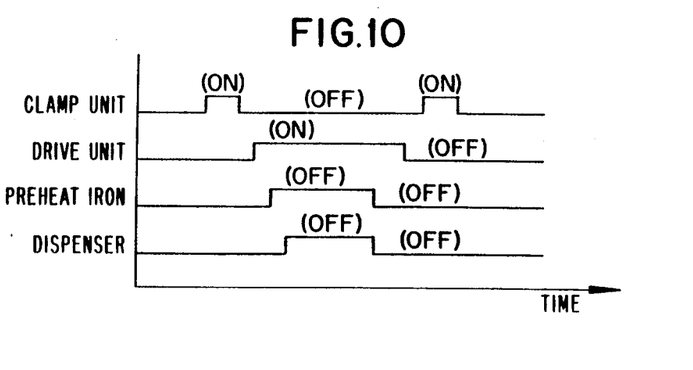
FIG. 10 is a time chart showing the operational relationship between several units of the apparatus shown in FIG. 8A.

FIG. 10 shows a time chart illustrative of the operational relationship between several units of the apparatus. Such operational relationship is obtained by the control of a microcomputer incorporated in a control unit, not shown, of the apparatus shown in FIG. 8A.

Figure 11:
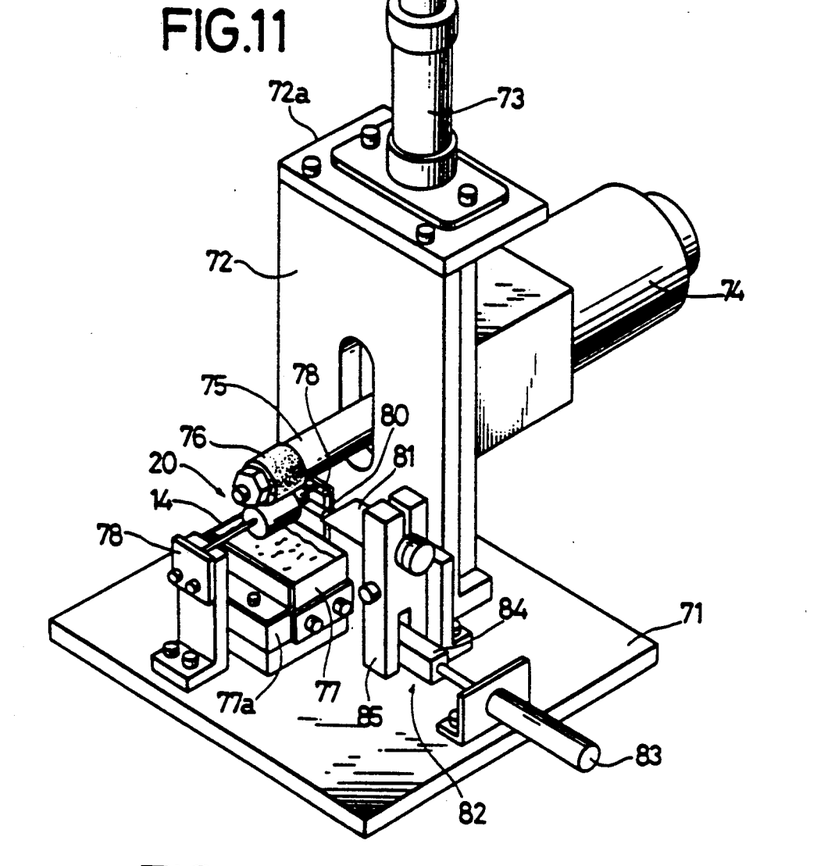
FIG. 11 is a perspective view of a finishing apparatus according to another embodiment.

A modified apparatus shown in FIG. 11 differs from the apparatus of the foregoing embodiment shown in FIGS. 8A and 8B in that a molten sublimable material is applied upward to a lower part of the outer periphery of a commutator blank. The apparatus includes a rectangular base 71, an inverted L-shaped vertical support 72 secured to the base 71, and an air cylinder 73 mounted on an upper horizontal wing 72a of the support 72. The air cylinder 73 has a piston rod (not shown) connected to the frame or casing of a drive motor 74 for vertically movably supporting the motor 74. The motor 74 has a drive shaft 75 extending horizontally through a vertical oblong hole in the support 72 and supporting thereon a drive roller 76. Positioned on the base 71 immediately below the drive roller 76 is a container or bath 77 for holding a sublimable material 14. The bath 77 is provided with a temperature-controlled heater 77a for heating the bath 77 at a temperature above the melting point of the sublimable material 14 to thereby keep the sublimable material 14 in the molten or liquid state. A pair of laterally spaced support stems are disposed on opposite sides of the bath 77 for rotatably supporting thereon a rotor assembly 20 immediately below the drive roller 76. The apparatus also includes a preheat iron 79 (FIG. 12) for heating a commutator blank 10,, and a ladle 80 for dipping up the molten sublimable material 14 from the bath 77 and then applying the same onto the commutator blank 10'. The ladle is normally disposed in the bath 77 as indicated by the phantom lines shown in FIG. 12. The preheat iron 79 is disposed above the commutator blank 10' and vertically movable to engage the commutator blank 10'. The iron 79 is provided with a temperature-controlled heater 79a. The ladle 80 is positioned below the commutator blank 10' and cantilevered to a support block 81 connected with a drive mechanism 82.

The drive mechanism 82 is so constructed as to rock or reciprocate the ladle 80 in a vertical plane and includes an air cylinder 83 mounted on the base 71, and an actuating rod 84 connected at its one end to a piston rod of the air cylinder 83 and pivoted at the opposite end to the lower end of a vertical lever 85, the upper end of the vertical lever 85 being pivotally connected to the support block 81. The support block 81 is provided with a temperature-controlled heater (not shown) for heating the ladle 80 at a temperature above the melting point of the sublimable material 14.

Figure 12:
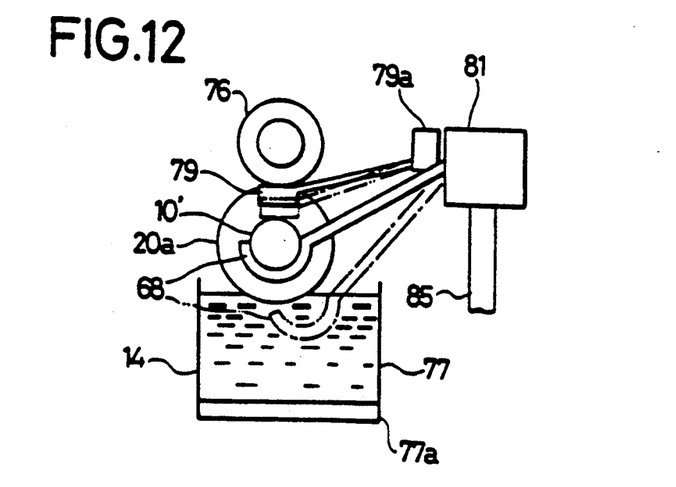
FIG. 12 is a schematic front elevational view of a portion of the apparatus shown in FIG. 11, showing the manner in which grooves in a commutator blank are filled with a sublimable material.
Figure 13:
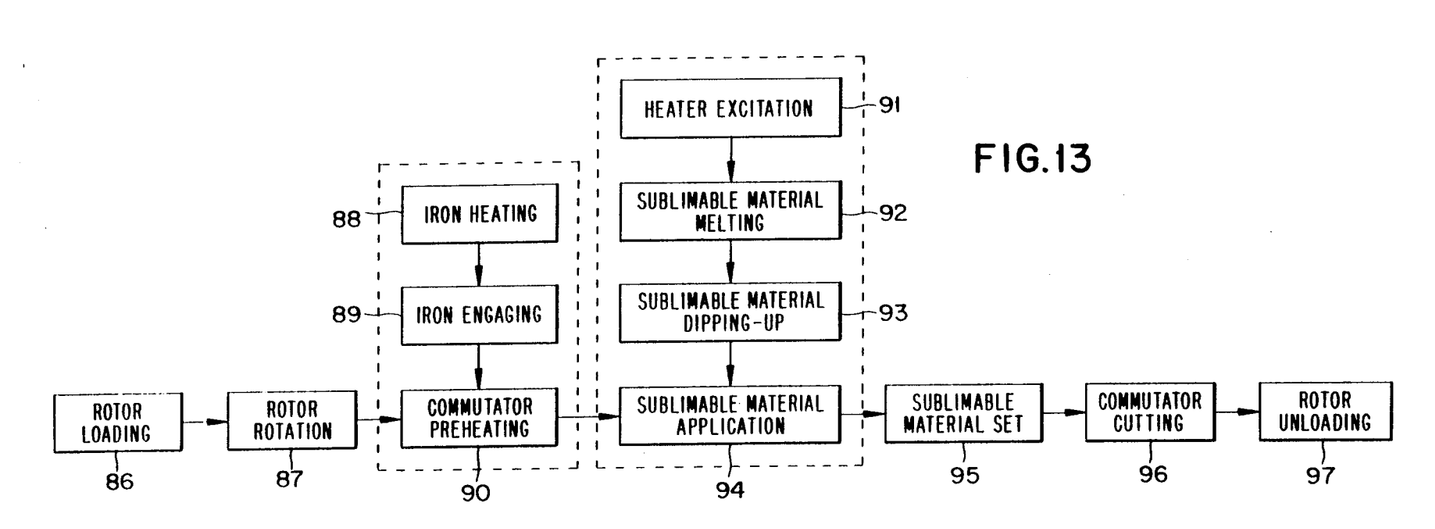
FIG. 13 is a flow chart illustrative of the operation of the apparatus shown in FIG. 11.

The apparatus of the foregoing construction operates as follows: After a rotor assembly 20 having a commutator blank 10' to be processed is supported on the support stems 78 (the loading step 86 shown in FIG. 13), the air cylinder 73 is actuated to lower the motor 74 until the drive roller 76 engages an armature 20a (FIG. 12) of the rotor assembly 20. Substantially at the same time, the motor 76 is energized to rotate the drive roller 76 so that the rotor assembly 20 is rotated by the drive roller 76 (the revolving step 87 shown in FIG. 13). The preheat iron 79 which has been heated by the heater 79a is lowered into sliding contact with the commutator blank 10' for preheating the latter at a temperature above the melting point of the sublimable material 14 (the heating, contacting and preheating steps 88-90 shown in FIG. 13). Thereafter, the preheat iron 79 may be moved upwardly away from the commutator blank 10'. During that time, the sublimable material is kept in the liquid state as the bath 77 is continuously heated by the heater 77a at the temperature above the melting point of the sublimable material (the heating and melting steps 91 and 92 shown in FIG. 13). The ladle 80 is also heated by the non-illustrated heater at the same temperature as the bath 77. Then the air cylinder 83 is actuated to move the ladle 80 angularly upwardly from the phantom-lined position to the solid-lined position as shown in FIG. 12. Consequently, the molten sublimable material 14 is dipped out from the bath 77 and then applied onto the commutator blank 10' by means of the ladle 80 (the dipping-out and applying steps 93 and 94 shown in FIG. 13). The molten sublimable material 14 thus applied will fill the grooves in the commutator blank 10'. This application step may be repeated, if necessary. Subsequently, the preheat iron 77 and the ladle 80 are released from engagement with the commutator blank 10' whereupon the sublimable material 14 is cooled to set in the grooves in the commutator blank 10'(the solidifying step 95 shown in FIG. 13).

Thereafter, the commutator blank 10' with its grooves filled with the solid sublimable material 14 is subjected to a cutting step 96 (FIG. 13) in which the outer peripheral surface of the commutator blank 10' is cut in the same manner as shown in and described with reference to FIG. 6. The commutator blank 10' is thus finished into a commutator substantially identical to the commutator 10 shown in FIG. 1. Finally, the rotor assembly 20 is removed from the apparatus (the unloading step 97 shown in FIG. 13).

Figure 14:
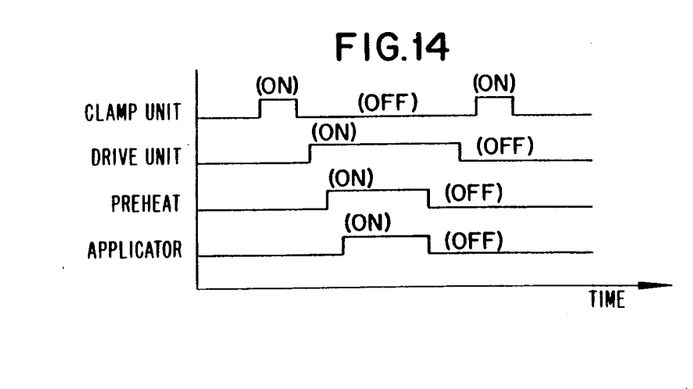
FIG. 14 is a time chart showing the operational relationship between several units of the apparatus shown in FIG. 11.

FIG. 14 shows a time chart illustrative of the operational relationship between several units of the apparatus which is performed under the control of a microcomputer incorporated in a non-illustrated control unit of the apparatus.

As appears clear from the foregoing description, it is a feature of the present invention to fill the grooves in a commutator blank 10' either with a soft brittle water soluble material or with a soft brittle self-vanishing or disappearing sublimable material before the commutator blank 10' is cut on its outer peripheral surface. It is therefore appreciated that this groove-filling process or treatment is also effectively usable, as a pre-cutting treatment of a grooved surface of an article, in an application in which burr-free cutting of the grooved surface is a major requirement. Typical examples of such grooved articles to which the pre-cutting treatment is applicable include a shaft having a keyseat, a spool or bobbin having an axial groove, a slide member having a dovetail groove, etc.

Obviously, various modifications and variations of the present invention are possible in the light of the above teaching. It is therefore to be understood that within the scope of the appended claims the invention may be practiced otherwise than as specifically described.

What is claimed is:

1. An apparatus for finishing a commutator blank having a plurality of commutator bars supported by and around a commutator sleeve molded of a thermosetting synthetic resin, the commutator bars being circumferentially spaced by and electrically insulated from one another by grooves formed in an outer peripheral surface of the commutator blank and defined between adjacent ones of the commutator bars and an outer peripheral surface of the commutator sleeve, said apparatus comprising:

a power-driven clamp unit for rotatably supporting the commutator blank;

means for filling the grooves in the commutator blank with a sublimable material as the commutator blank is being rotated by said power driven clamp unit, said filling means including means positioned above the commutator blank for applying the sublimable material in the molten liquid state to the outer peripheral surface of the commutator blank, and a preheating element slidably engageable with the outer peripheral surface of the commutator blank being rotated to heat the commutator blank at a temperature above the melting point of said sublimable material for enabling the molten sublimable material to retain its flowability and flow smoothly into the grooves in the outer peripheral surface to fill the grooves, and retractable means disposed at a position opposed to said means for applying the sublimable material to the commutator blank, said retractable means driving the preheating element retractably from the surface of the commutator blank, said preheating element being disposed below the commutator blank at a location opposite said means for applying the sublimable material to the commutator blank; and means for cutting the outer peripheral surface of the commutator blank after the grooves of the commutator blanks are filled with the sublimable material.

2. The apparatus according to claim 1, wherein said applying means includes a dispenser having a nozzle disposed directly above said preheating element, said preheating element comprising a preheating iron having a substantially semicircular recess receptive of the commutator blank and complementary in contour to the shape of the outer peripheral surface of the commutator blank.

3. An apparatus for finishing a commutator blank having a plurality of commutator bars supported by and around a commutator sleeve molded of a thermosetting synthetic resin, the commutator bars being circumferentially spaced by and electrically insulated from one another by grooves formed in an outer peripheral surface of the commutator blank and defined between adjacent ones of the commutator bars and an outer peripheral surface of the commutator sleeve, said apparatus comprising:

a power-driven clamp unit for rotatably supporting the commutator blank;

means for filling the grooves in the commutator blank with a sublimable material as the commutator blank is being rotated by said power driven clamp unit, said filling means including means for applying the sublimable material in the molten liquid state to the outer peripheral surface of the commutator blank, and a preheating element slidably engageable with the outer peripheral surface of the commutator blank being rotated to heat the commutator blank at a temperature above the melting point of said sublimable material for enabling the molten sublimable material to retain its flowability and flow smoothly into the grooves in the outer peripheral surface to fill the grooves, said preheating element being retractable from the outer peripheral surface of the commutator blank for causing the sublimable material to cool down and set its shape in the grooves, said applying means including a bath for holding the sublimable material in the molten state, and a ladle for dipping out the molten sublimable material from said bath onto the outer peripheral surface of the commutator blank, said preheating element comprising a preheating iron disposed above said ladle; and means for cutting the outer peripheral surface of the commutator blank after the grooves of the commutator blanks are filled with the sublimable material.

4. An apparatus for finishing a commutator blank having a plurality of commutator bars supported by and around a commutator sleeve molded of a thermosetting synthetic resin, the commutator bars being circumferentially spaced by and electrically insulated from one another by grooves formed in an outer peripheral surface of the commutator blank and said grooves being defined between adjacent ones of the commutator bars and an outer peripheral surface of the commutator sleeve, said apparatus comprising:

a power-driven clamp unit for rotatably supporting the commutator blank;

means for filling the grooves in the commutator blank with a sublimable material as the commutator blank is being rotated by said power-driven clamp unit, said filling means including an applying means having a dispenser positioned above the commutator blank for applying the sublimable material in the molten liquid state to the other peripheral surface of the commutator blank, and a preheating element positioned below the commutator blank at a location opposite said applying means, said preheating element comprising a preheating iron having a substantially semicircular recess receptive of the commutator blank and complementary in contour to the shape of the outer peripheral surface of the commutator blank, said preheating element being slidably engageable with the other peripheral surface of the commutator blank being rotated to heat the commutator blank at a temperature above the melting point of said sublimable material for enabling the molten sublimable material to retain its flowability and flow smoothly into the grooves in the outer peripheral surface to fill the grooves, and retractable means disposed below the commutator blank, said retractable means retractably driving the preheating element from the surface of the commutator blank; and means for cutting the outer peripheral surface of the commutator blank after the grooves of the commutator blanks are filled with the sublimable material.

* * * * *